Figure 1:
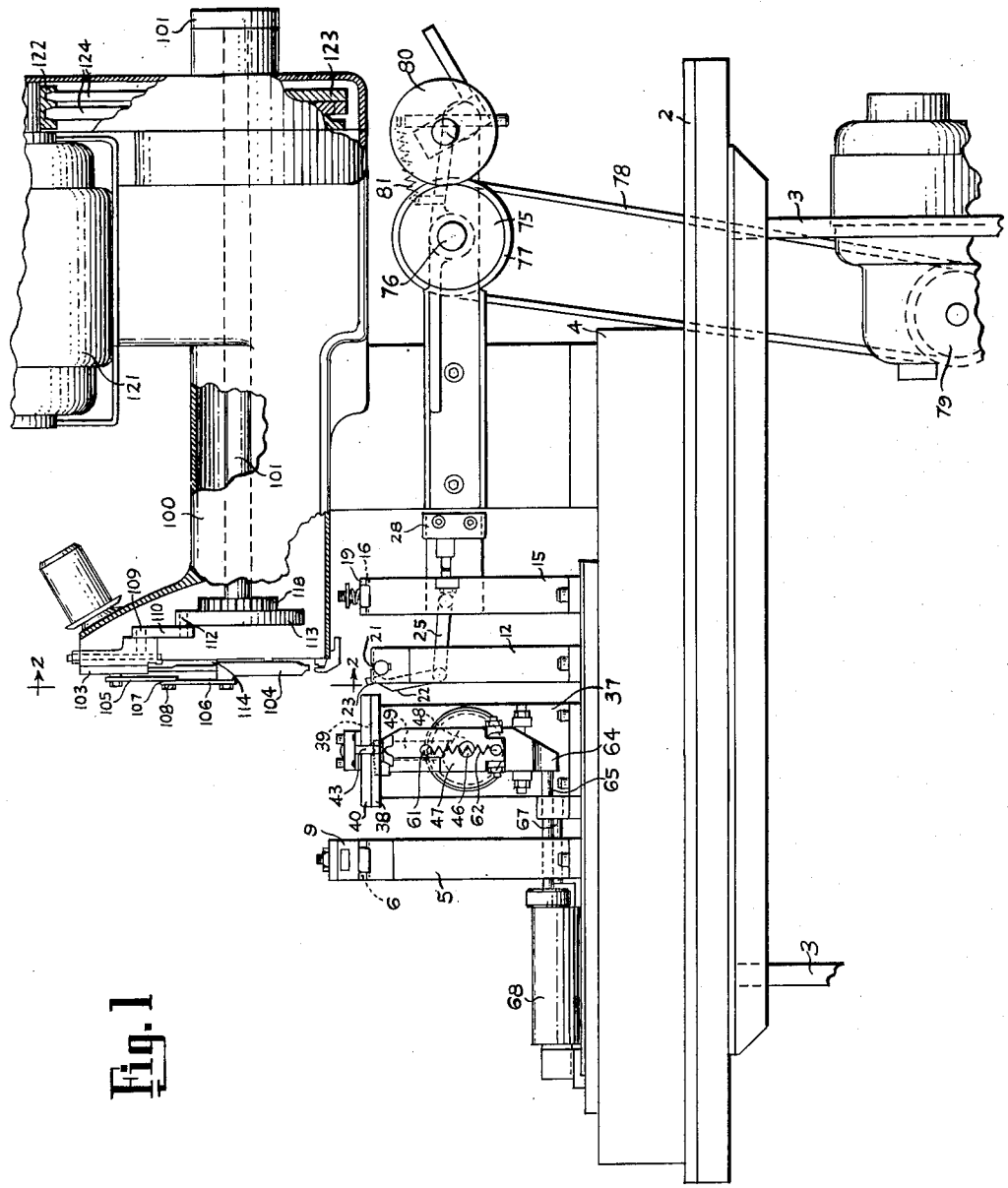

INVENTOR.
GEORGE W. RUNNELS, JR.
BY R. E. Meech
ATTORNEYS.

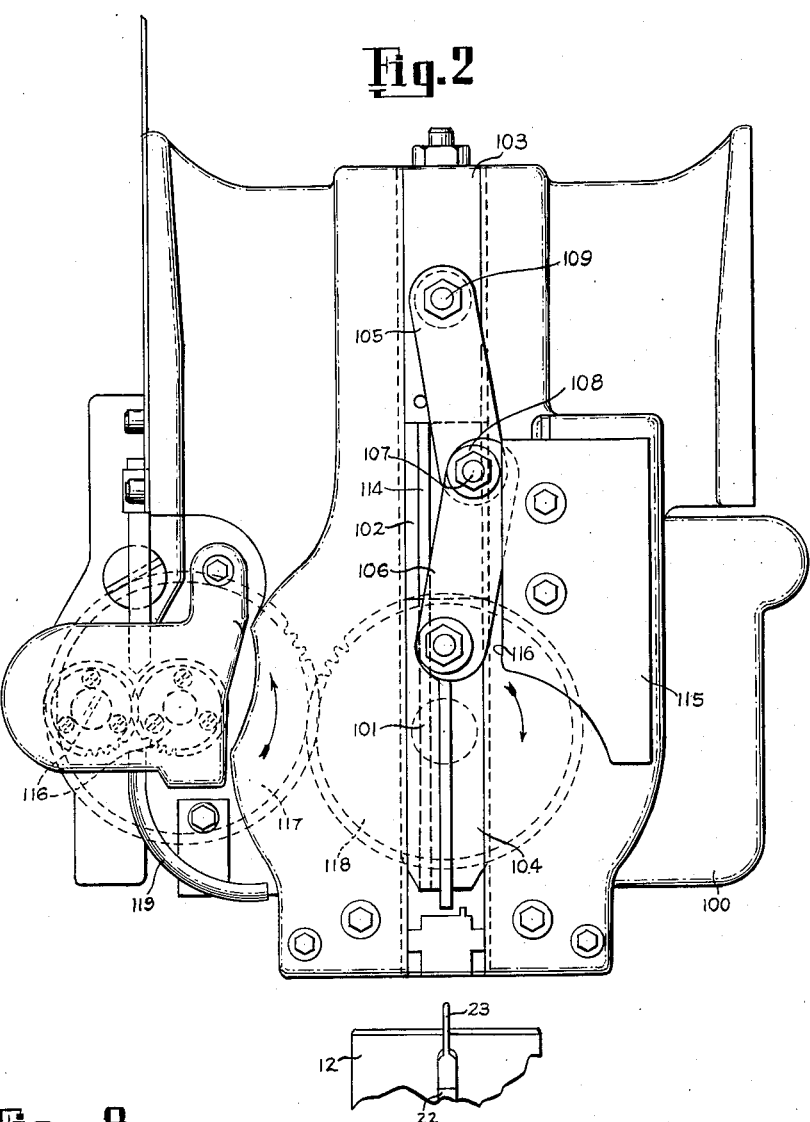
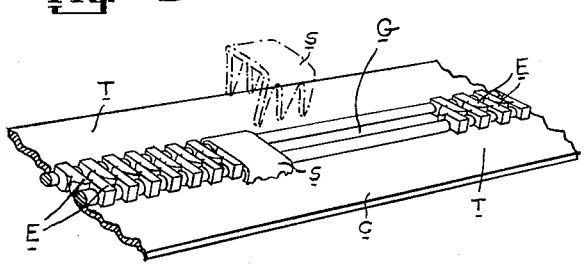
INVENTOR.
GEORGE W. RUNNELS, JR.

Feb. 8, 1966 G. W. RUNNELS, JR 3,233,810
APPARATUS FOR ATTACHING END STOP MEMBERS
TO CONTINUOUS FASTENER LENGTH CHAIN
Filed Jan. 20, 1964 5 Sheets-Sheet 3

INVENTOR.
GEORGE W. RUNNELS, JR.
BY R. E. Meech
ATTORNEYS.

INVENTOR.
GEORGE W. RUNNELS, JR.
BY
ATTORNEYS

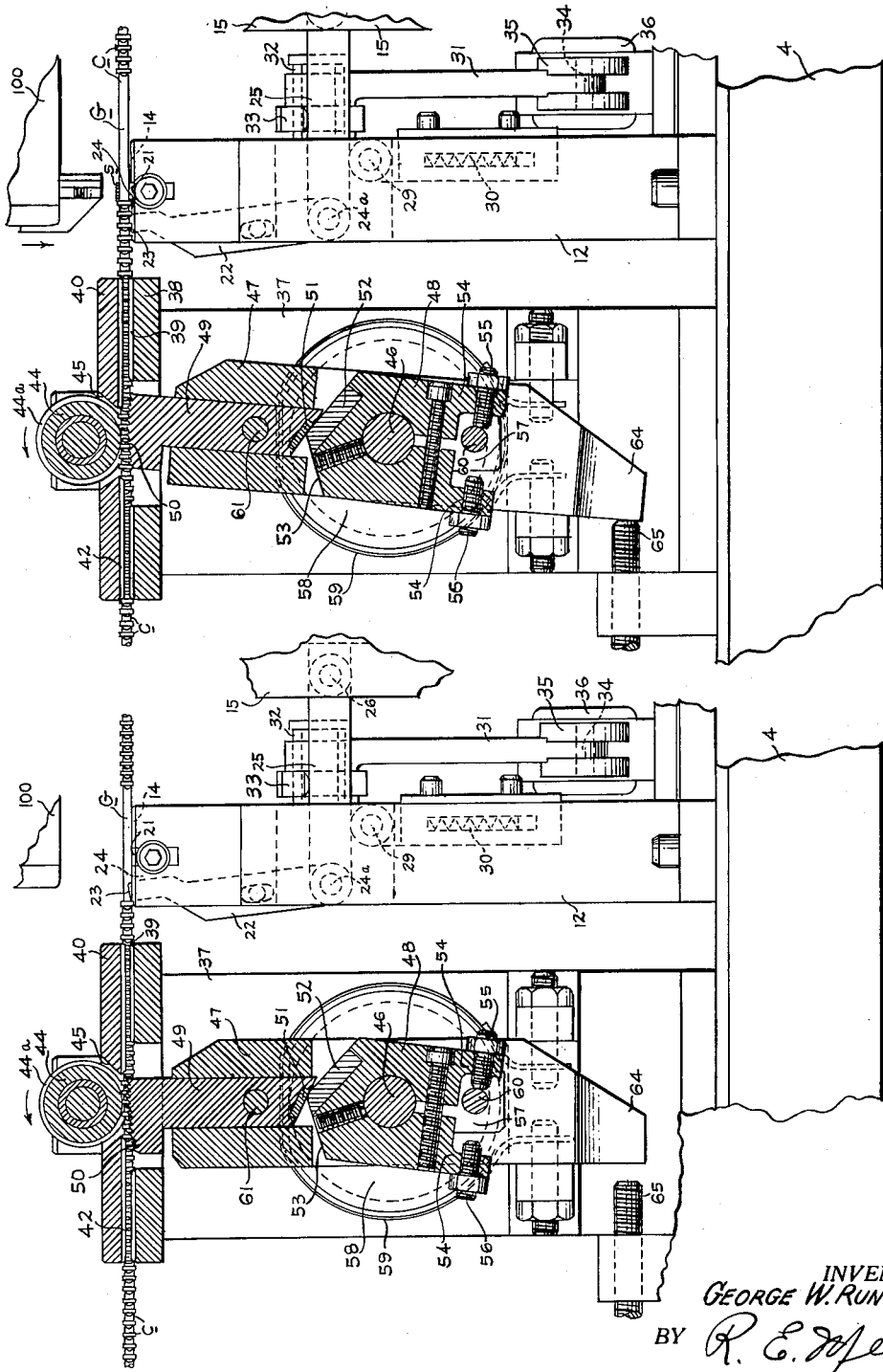

United States Patent Office 3,233,810
Patented Feb. 8, 1966

3,233,810
APPARATUS FOR ATTACHING END STOP MEMBERS TO CONTINUOUS FASTENER LENGTH CHAIN
George W. Runnels, Jr., Meadville, Pa., assignor to Talon, Inc., a corporation of Pennsylvania
Filed Jan. 20, 1964, Ser. No. 338,668
24 Claims. (Cl. 227—7)

This invention relates to the manufacture of slide fasteners, and more particularly to apparatus for attaching end stop members to continuous length slide fastener chain.

As is well known to those skilled in the art of manufacturing slide fasteners, in the manufacture thereof, it is comon practice to provide continuous length fastener chain which consists of a pair of stringer tapes having a series of spaced-apart mated interlocking fastener elements attached to their opposed edges. It is customary to provide gap spaces in such chain at spaced apart intervals therealong at which points the chain is later cut into individual fastener lengths. It is to apparatus for attaching end stop members to the opposed edges of the stringer tapes to bind them together at the gap space directly next to the endmost fastener elements on the stringers that the present invention relates.

Accordingly, it is the general object of the present invention to provide improved apparatus for attaching automatically end stop members of the staple type to the opposed edges of the stringer tapes at each of the gap spaces as the chain moves into and through the apparatus.

It is another object of the invention to provide improved end stop attaching apparatus for continuous length slide fastener chain wherein the actuation of the apparatus is controlled automatically by the fastener chain as it passes therealong.

It is a further object of the invention to provide improved end stop attaching apparatus which not only attaches the end stop member to continuous length fastener chain but also forms the end stop member immediately previous to the attaching operation.

It is still a further object of this invention to provide improved apparatus for applying end stop members to continuous length fastener chain which is simple and inexpensive in its construction and yet efficient and effective in its use, and which is less complex and therefore easier to maintain and operate than equipment heretofore suggested and used whereby less skilled labor is required.

Various other objects and advantages of this invention will be more apparent in the course of the following specification, and will be particularly pointed out in the appended claims.

In the accompanying drawings, there is shown for the purpose of illustration, an embodiment which the invention may assume in practice.

Figure 3:
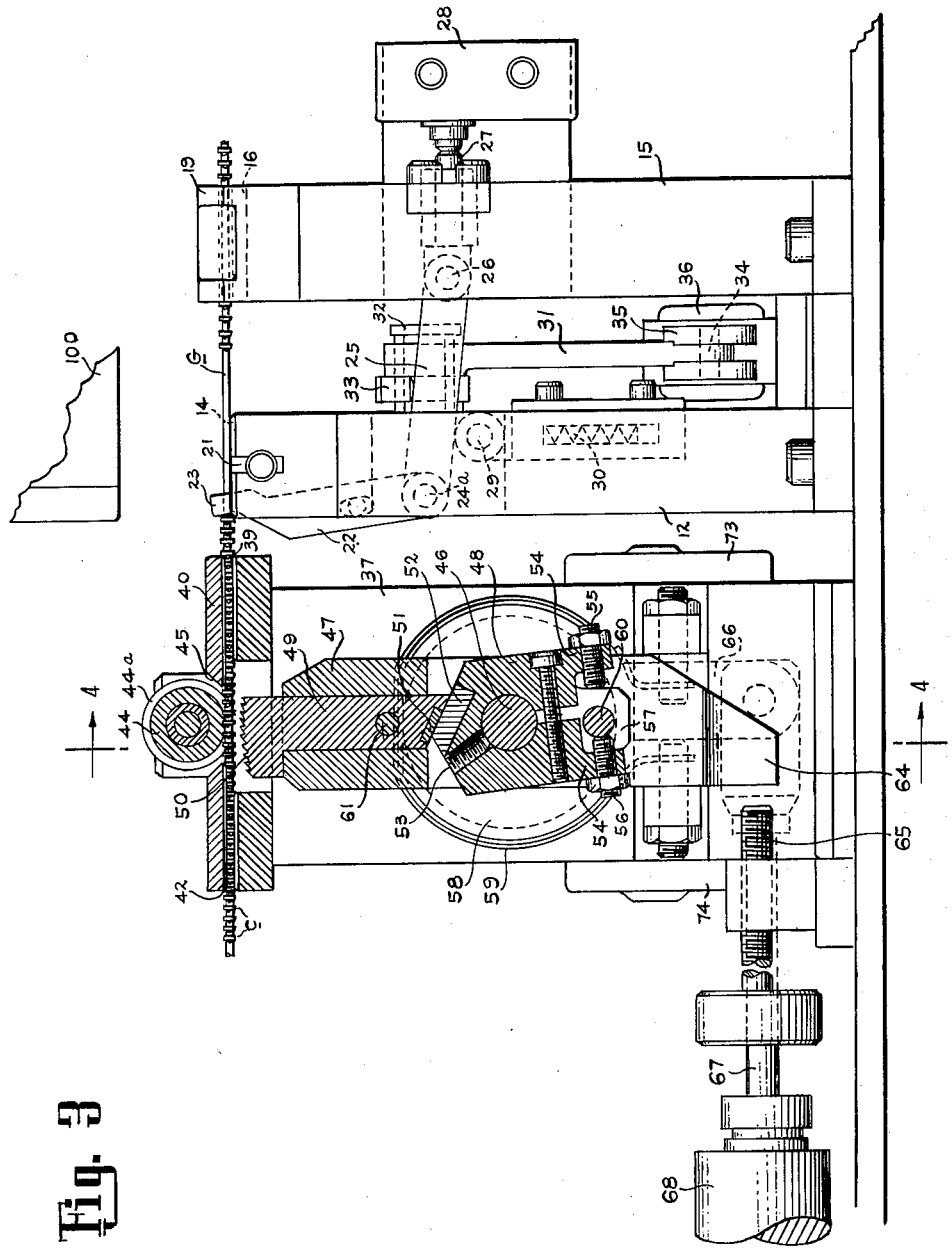
Figure 4:
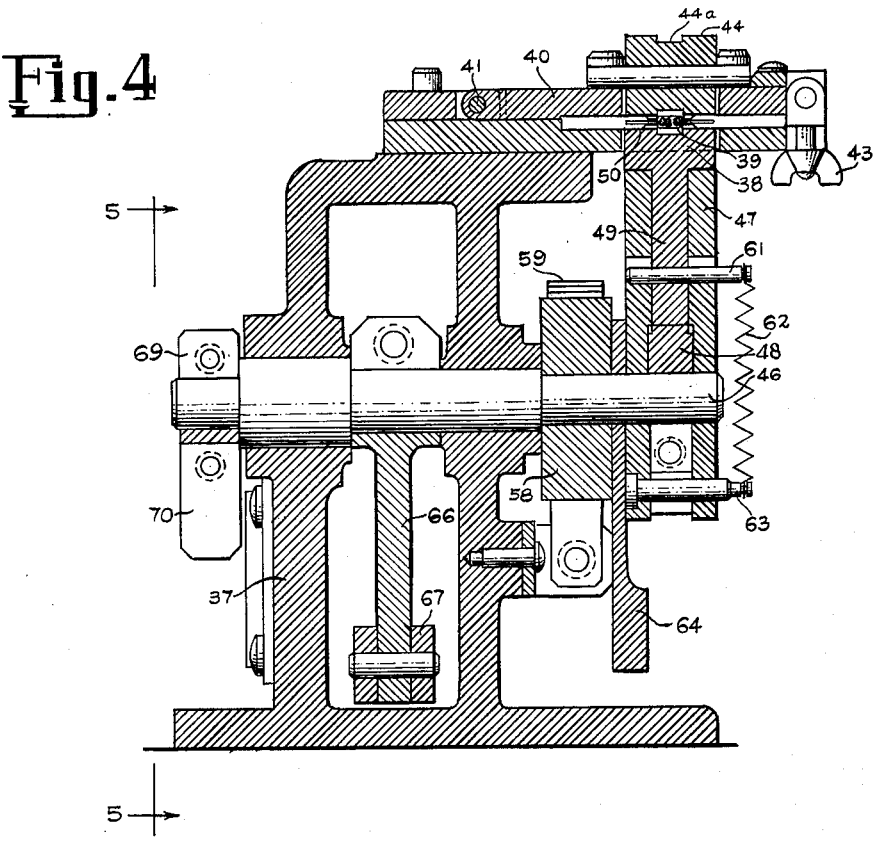
Figure 5:
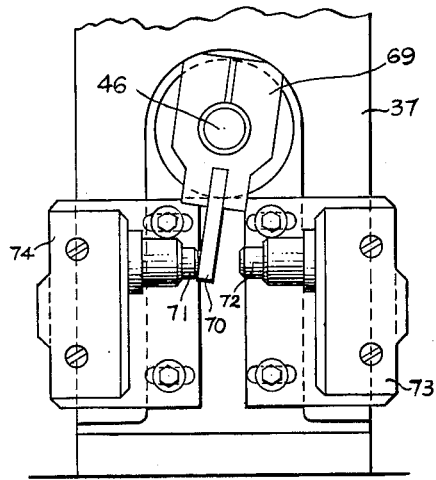

In these drawings:

FIG. 1 is a front elevational view of the improved apparatus in accordance with the present invention, FIG. 2 is a sectional view taken on line 2—2 of FIG. 1, FIG. 3 is a front elevational view of a part of the apparatus, as shown in FIG. 1, partly in section and partly broken away, showing the various parts of the mechanism in their normal positions, FIG. 4 is a sectional view taken on line 4—4 of FIG. 3, FIG. 5 is a sectional view taken on line 5—5 of FIG. 4, FIG. 6 is a front elevational view of a part of the apparatus, similar to FIG. 3, showing the finger-like stop member in its retracted position and the shoe-like member in its protracted position, FIG. 7 is a view similar to FIG. 6 showing the oscillating member together with the shoe-like member carried thereby moving the fastener chain forwardly while the finger-like member is still in its retracted position, and FIG. 8 is a fragmentary perspective view of a section of fastener chain showing an end stop member attached thereto and showing in broken lines an end stop member in position to be attached.

Referring more particularly to the drawings, the improved apparatus of the present invention consists of a frame or support 2 having legs 3 and a table top 4. There is arranged on the top 4 adjacent one end thereof, as more clearly shown in FIG. 1, a vertical bracket or supporting member 5 having a plate-like member 6 arranged on the top thereof in which there is provided a lower channeled guideway substantially rectangular shape in cross section. There is hingedly attached to one side of this plate-like member 6, an upper guide or hold down block member 9 having a channeled guideway arranged therein which cooperates with the lower guideway for guiding the fastener chain C into the apparatus.

At a spaced distance beyond the bracket or supporting member 6 there is positioned on the table top 4, another vertical bracket or supporting member 12 having a channeled guideway 14 arranged therein in alignment with the guideway in the member 6.

Beyond this bracket or supporting member 12 there is mounted on the table top 4, still another vertical bracket or supporting member 15 which also have a plate-like member 16 carried thereby having a lower channeled guideway therein in alignment with the guideways in the members 6 and 13. There is hingedly attached to one side of this plate-like member 16, an upper guide or hold down block 19 having a channeled guideway therein which likewise cooperates with the lower guideway for positioning the fastener chain and guiding the same through the apparatus.

There is positioned in the bottom side of the guideway 14 of the plate-like member 13 of the bracket 12 centrally thereof, a stationary lower anvil 21 which cooperates with a conventional end stop stapling mechanism to attach an end stop member S to the stringer tapes T in a well known manner and which will hereinafter be more fully described. There is arranged centrally of this bracket or supporting member 12, as more clearly shown in FIGS. 3, 6 and 7, a vertically extending lever 22 having an upwardly extending finger-like portion 23 arranged on the upper end thereof which is disposed normally in a slot 24 in the plate-like member 13 and extends up through the guideway 14 therein so as to be positioned in the path of the fastener chain C as it passes therealong. The lower end of this lever 22 is pivotally attached, as at 24a, to one end of a horizontal connecting member 25 which extends into an opening in the bracket 15 wherein the opposite end is directly connected, as at 26, to a plunger-like member 27, reciprocally mounted in this bracket 15. There is also mounted on this bracket 15, a micro-switch 28 which is actuated by this plunger-like member 27. The connecting member 25 rests preferably on roller 29 supported in the bracket 12 by a compression spring 30.

As more clearly shown in FIGS. 3, 6 and 7 of the drawings, between the bracket members 12 and 15, there is arranged a bell-crank member 31 which is pivotally attached to the bracket 12, as at 32. One arm 33 of this bell-crank member 31 rests on the upper side of the connecting member 25 and the other arm is pivotally connected at the end thereof, as at 34, to outer end of the armature or plunger 35 of a solenoid 36.

There is mounted on the table-top 4 between the brackets 5 and 12, a frame-like supporting member or housing 37 on top of which there is arranged a plate-like member 38 having a lower channeled guideway 39 therein also substantially rectangular shape in cross section and disposed in alignment with the guideway 14. There is also provided a plate-like guide or hold down block 40 which is hingedly attached, as at 41, to the plate-like member 38 to one side thereof. There is arranged in this guide or hold down block 40, an upper channeled guideway 42 which cooperates with the guideway 39 to guide the fastener chain. There is provided preferably a thumb nut locking screw 43 for holding the hold down block 40 in position relative to the plate-like member 38. There is arranged in suitable bearings on the upper side of this hold down block member 40, a freely rotatable knurled roller 44 which extends into and through a rectangular aperture or window 45 directly opposite the plate-like member 38 and which has a central guide groove 44a arranged around the periphery thereof.

There is suitably journaled in this supporting member 37, a horizontal oscillatable shaft 46 having a diametrically extending oscillating member 47 arranged on one end thereof. There is securely arranged on this shaft 46, a block-like cam member 48 which is disposed opposite a portion of the oscillating member 47 with which it cooperates. There is movably mounted on this member 47, a reciprocable shoe-like member 49 which preferably has a knurled upper engaging portion 50, which cooperates with the knurled idle roller 44 in a manner and for a purpose to be described which is one of the most important aspects of the present invention. The inner end of this movable shoe-like member 49 preferably has a beveled end surface, as at 51, which cooperates with beveled cam surfaces 52 and 53 arranged on the inner end of the block-like member 48. On the opposite end of the block-like member 48, there is arranged in a pair of spaced-apart opposed extensions 54, a pair of opposed adjustable screws 55 and 56 which extend into the space 57 between the extensions 54. There is also securely arranged on the shaft 46 next to the block-like member 48 and attached to this oscillating member 47, a circular drum-like member 58 around which there is disposed a friction brake 59. There is carried by the circular drum-like member 58, an outwardly extending pin 60 which is disposed parallel to the shaft 46 and which extends into the space 57 between the inner ends of the adjustable screws 55 and 56 with which it cooperates.

There is carried by the shoe-like member 49, a horizontal pin 61 to which the outer end of one end of a tension coil spring 62 is attached. The opposite end of this spring 62 is attached to a horizontal pin 63 carried by the block-like member 48. It is the purpose of this spring 62 to maintain the shoe-like member in its normal or protracted position and maintain the beveled surface 51 thereof in contact alternately with the beveled surfaces 52 and 53 of the block-like member 48. There is also arranged with this block-like member 48 on the shaft 46, a downwardly extending member 64 which cooperates with the end of an adjustable screw 65 mounted on the frame for adjusting purposes.

There is also secured to the shaft 46 intermediate the length thereof, a connecting rod or member 66 having its lower or free end thereof pivotally attached to the outer end of a plunger 67 of an air cylinder 68, as more clearly shown in FIGS. 3 and 4.

On the inner end of this shaft 46 there is secured thereto, a member 69 having its free end 70 disposed between the opposed contacts 71 and 72 of the microswitches 73 and 74, respectively, mounted on the inner side of the housing 37.

At the delivery end of the apparatus there is arranged mechanism for pulling the continuous length fastener chain from its source of supply, into and through the apparatus. Such mechanism, as shown in FIG. 1 consists of a feed drum or roller 75 over and partially around the periphery of which the continuous chain is disposed and passes, which roller is mounted on a shaft 76 suitably journaled on a suitable support. There is also secured to this shaft 76, a pulley 77 around which there is arranged a belt 78 which also is disposed around a pulley 79 on the shaft of a motor. There is also provided a hold down or rotatable guide roller 80 which is suitably journaled on the support and which cooperates with the roller 75 to pull the fastener chain along and through the various guideways and through the apparatus. This roller 80 is preferably maintained normally in tangential contact with the periphery of the roller 75 by a coil spring arrangement 81.

There is mounted on the frame or support 2 adjacent the delivery end of the apparatus, an end stop stapling mechanism which in cooperation with the stationary anvil 21 applies staple type end stops to the stringer tapes T, as shown in FIGS. 1 and 2 of the drawings. Any conventional type stapling mechanism may be used in connection with the apparatus of the present invention and it will be understood that the mechanism shown herein constitutes no part of the invention. Accordingly, the mechanism shown herein will only be briefly described.

The stapling mechanism is of a conventional design and constitutes no part of the present invention and as shown more clearly in FIGS. 1 and 2, comprises a housing 100 having an elongated shaft 101 suitably journaled therein. On the front end of this housing opposite the inner end of this shaft 101, there is provided a head portion having a vertical guideway 102 therein in which there is disposed an upper movable ram 103 and a lower movable ram 104. These two rams 103 and 104 are interconnected by the levers 105 and 106 and these two levers are pivotally interconnected, as at 107, at which point there is arranged a roller cam follower 108. This upper ram 103 is pivotally connected, as at 109, by connecting rod 110 to a crank pin 112 carried by the crank 113 which is mounted on the end of the shaft 101.

There is arranged with the lower ram 104, a forming and cutting punch for cutting a blank from the end of the wire strip, forming the end stop and depositing it in a reciprocable transfer member in a well known manner. There is carried by the upper ram 103, an elongated upper anvil 114 which extends down through the lower ram 104 at a point directly opposite the lower stationary anvil 21. On the outer side of the head of the housing 100 there is arranged a cam plate-like member 115 having an arcuated cam edge 116 with which the cam roller 108 cooperates when the upper ram 103 is actuated by the crank 113 upon rotation of the shaft 101.

As more clearly shown in FIGS. 1 and 2 of the drawings, there is suitably mounted on the housing 100 to one side of the head portion thereof, a pair of opposed feed rolls 116 for feeding the wire strip intermittently into the mechanism and in under the staple cut-off and forming punch (not shown). These feed rolls are geared together and one is driven by a gear 117 which meshes with a gear 118 arranged on the shaft 101 directly next to the crank 113. It will be understood that the wire strip passes from a suitable source of supply, usually a reel, between the feed rolls 116 through the guideway 119 to position in under the forming punch.

On the outer end of the shaft 101, there is arranged within the housing 100 a conventional clutch mechanism for driving the shaft intermittently in a well known manner. The actuation of this clutch may be controlled electrically or by a pneumatic actuated valve and, in either case, there is provided a solenoid (not shown) for controlling the actuation thereof. The energization of this solenoid is controlled by the micro-switch 73 to which it is electrically connected. The clutch is driven preferably by a suitable motor 121 through the pulleys 122 and 123 and belts 124.

Having described the construction of the improved apparatus in accordance with the present invention, it functions in the following manner. It will be understood that the apparatus is designed to apply bottom or end stop members of the staple type to continuous length fastener chain directly next to the endmost fastener elements at each of the gap spaces, as shown in FIG. 8 of the drawings.

Such a fastener chain C consists of a pair of stringer tapes T having a series of spaced apart mated fastener elements E attached to their opposed beaded edges. The chain has been previously manufactured or a series of fastener elements removed therefrom at spaced intervals therealong so as to provide a series of spaced-apart gap spaces G along the chain at which gap spaces the chain is later to be cut so as to provide individual fastener lengths. There is attached to the opposed edges of the stringer tapes T at the end of each of the gap spaces G, directly next to the endmost fastener elements E at the gap, a bottom or end stop member S joining the tapes together for the purpose of limiting the opening movement of the slider along the fastener and it is to apparatus for attaching this end stop member that the present invention relates.

Now as to the operation of the apparatus, the fastener chain C is threaded into and through the apparatus so that the chain is positioned in the guideway 42 and in under the knurled roller 44, and under the guide blocks 40 and 19 with the finger-like portion 23 extending upwardly into and through the gap G in the chain, and disposed over and around the feed drum 75, as more clearly shown in FIG. 3 of the drawings. The apparatus having the fastener chain positioned therein is now in readiness for operation and the motors for controlling and actuating the various mechanisms are then energized so as to rotate the shafts 76 and 101.

It will be understood that the fastener chain C is pulled into and through the apparatus and along the successive guideways carried by the members 5, 37, 12 and 15 by the rotatable feed roller or drum 75. As the chain is moved therealong the finger-like end portion 23 of the lever 22 will be projected upwardly due to the action of the spring 30 into a gap space G of the chain when the gap is positioned opposite the same, as shown in FIG. 3 of the drawings. As the chain continues to move along, the endmost fastener element of the gap strikes the finger-like portion 23 so as to move the lever 22 about its pivotal connection with the member 12 thereby moving the lever 25 to the left, as shown in FIG. 3, which in turn actuates the microswitch 28.

This micro-switch 28 controls the actuation of a valve (not shown) which in turn controls the actuation of the air cylinder 68. It follows then that the valve will permit air to enter the cylinder 68 thereby actuating the plunger 67. This plunger in turn rotates the shaft 46 in a clock-wise direction, as shown in FIG. 6, due to the action of the member 66 mounted thereon and to which member the end of the plunger 67 is pivotally connected, as more clearly shown in FIGS. 3 and 4.

In the initial movement of the shaft 46, the block-like cam member 48 mounted thereon will move the shoe-like member 49 upwardly to position, as shown in FIG. 6, whereby the knurled upper portion 50 thereof will contact the lower side of the chain C and force the same upwardly against the idle roller 44 so as to firmly grip the chain and to momentarily arrest the movement thereof. Also, upon rotation of this shaft 46 the member 70 mounted thereon will be moved away from the contact 71 of the micro-switch 74, as more clearly shown in FIG. 5, so as to close a circuit (not shown). This switch controls the actuation of a solenoid 36 which in turn actuates the bell-crank 31 whereby the arm 33 thereof moves the member 25 downwardly. As this member 25 moves downwardly the member 22 to which it is connected is also moved downwardly to its retracted position, as shown in FIG. 6, so that the finger portion 23 is moved out of the gap space G and out of the path of the chain C.

As the shaft 46 continues to rotate, the shoe-like member 49 in cooperation with the idle roller 44 will move the chain C at predetermined distance forwardly or to the right, as shown in FIGS. 6 and 7, so as to position the endmost fastener elements E at one end of the gap space G directly next to the stationary anvil 21 whereby the stringer tapes T are in position to receive a staple end stop S, as shown in FIG. 7. Upon continued rotation of the shaft 46, the free end 70 of the member 69 will be moved against the contact 72 of the microswitch 73 so as to close this switch whereby the stapling mechanism is actuated to cut a blank from the end of the wire by the punch, and the blank formed and attached to the opposed edges of the stringer tapes T, as shown in FIG. 8 of the drawings. An air cylinder contact valve (not shown) then permits air to enter the opposite end of the air cylinder 68 thereby moving the plunger 67 to its retracted position or to the left, as shown in FIG. 3, thereby rotating the shaft 46 in a counter-clockwise direction and so as to permit the shoe-like member 49 to move downwardly to its retracted or normal position away from the bottom of the chain C, as shown in FIG. 3. The finger-like portion 23 is then permitted to bear freely on the underside of the chain as it is pulled therealong by the feed roller 75 until the next gap space is positioned opposite the finger-like portion 23 when it again moves upwardly into the next succeeding gap space. The movement of the air cylinder plunger 67 to its retracted position is controlled by another micro-switch (not shown) arranged with and actuated by the stapling mechanism. This completes one cycle of operation of the apparatus and it will be understood that the cycle is repeated for the application of each end stop member at each of the gap spaces in the chain as it passes along and through the apparatus.

As a result it will be seen that the various mechanisms of apparatus of the present invention are so controlled and arranged that the end stop member is attached to the stringer tapes in the successive gap spaces directly next to the endmost fastener elements which is one of the most important aspects of the invention. It will also be seen that the fastener chain is moved a predetermined distance by the shoe-like member 49 so as to position the same accurately relative to the stapling mechanism to receive a staple and that this shoe-like member in cooperation with the idler roller 44 firmly grips and holds the chain in such position during the stapling operation.

While I have shown and described an embodiment which my invention may assume in practice, it will be understood that this embodiment is merely for the purpose of illustration and description, and that other forms may be devised within the scope of the invention as defined in the appended claims.

What I claim as my invention is:

1. In apparatus for attaching end stop members to continuous length slide fastener chain having a series of spaced-apart mated interlocking fastener elements secured to the opposed edges of a pair of stringer tapes and having a series of spaced-apart gap spaces arranged therealong throughout the length of the chain, the combination of a staple end stop applying mechanism, means for automatically conveying the slide fastener chain in a path opposite said mechanism, movable means arranged in the path of said chain with which an endmost fastener element of each of said gap spaces successively contacts to initially position the same, means responsive to the movement of said last mentioned means for moving the chain forwardly so as to position said endmost fastener element in position to receive an end stop member from the end stop applying mechanism directly next thereto, and means responsive to the movement of said last mentioned means for actuating said end stop applying means.

2. In apparatus for attaching end stop members to continuous length slide fastener chain having a series of spaced-apart mated interlocking fastener elements secured to the opposed edges of a pair of stringer tapes and having a series of spaced-apart gap spaces arranged therealong throughout the length of the chain, the combination of a support, means arranged on said support for guiding the chain into and through the apparatus, means for conveying the chain into and through the machine and through said guide means, means arranged on said support adjacent the path of said chain for delivering and attaching a staple-like end stop member so as to bridge the stringer tapes directly next to the endmost fastener element successively in each of the gap spaces as the chain moves along including a stationary anvil, means arranged on said support opposite said guide means and in the path of said chain for positioning the endmost fastener element of each of said gap spaces successively directly next to said anvil in position to receive an end stop member, and means for actuating said attaching means and said positioning means in timed relation.

3. In apparatus for attaching end stop members to continuous length slide fastener chain having a series of spaced-apart mated interlocking fastener elements secured to the opposed edges of a pair of stringer tapes and having series of spaced-apart gap spaces arranged therealong throughout the length of the chain, the combination of a support, means arranged on said support for guiding the chain into and through the apparatus, means for conveying the chain into and through the machine and through said guide means, means arranged on said support adjacent the path of said chain for delivering and attaching a staple-like end stop member so as to bridge the stringer tapes directly next to the endmost fastener element successively in each of the gap spaces as the chain moves along including a stationary anvil, means arranged on said support opposite said guide means and in the path of said chain for positioning the endmost fastener element of each of said gap spaces successively directly next to said anvil in position to receive an end stop member, and means arranged on said support responsive to the movement of said last mentioned means for actuating said attaching means.

4. In apparatus for attaching end stop members to continuous length slide fastener chain having a series of spaced-apart mated interlocking fastener elements secured to the opposed edges of a pair of stringer tapes and having a series of spaced-apart gap spaces arranged therealong throughout the length of the chain, the combination of a support, means arranged on said support for guiding the chain into and through the apparatus, means for conveying the chain into and through the machine and through said guide means, means arranged on said support adjacent the path of said chain for delivering and attaching a staple-like end stop member so as to bridge the stringer tapes directly next to the endmost fastener element successively in each of the gap spaces as the chain moves along including a stationary anvil, movable means arranged on said support in the path of said chain with which an endmost fastener element of each of said gap spaces successively contacts to initially position the same, means arranged on said support responsive to the movement of said last mentioned means for moving the chain forwardly so as to position said endmost fastener element directly next to said anvil and the chain in position to receive an end stop member from the attaching means directly next to said endmost fastener element, and means arranged on said support responsive to the movement of said last mentioned means for actuating said end stop attaching means.

5. In apparatus for attaching end stop members to slide fastener chain having a series of spaced-apart mated interlocking fastener elements secured to the opposed edges of a pair of stringer tapes and having a series of spaced-apart gap spaces arranged therein throughout the length of the chain comprising means for guiding and conveying the fastener chain into and through the apparatus, a movable finger arranged in the path of said chain which is adapted to extend successively into the gap spaces as the chain passes therealong to engage an endmost fastener element of the gap space, means arranged on said support at a spaced distance from said finger for engaging the chain intermittently to move the same forward a predetermined distance and to position the endmost fastener element of a gap space adjacent an end stop applying station, movable means upon which said last mentioned means is mounted, means for actuating said last mentioned means in response to the movement of said finger, and means for applying an end stop to the chain at a stop applying station directly next to the endmost fastener element of the sucessive gap spaces in response to the movement of said chain engaging means.

6. Apparatus as defined in claim 5, including a freely rotatable roller arranged opposite said chain engaging means with which the same cooperates to move the chain along upon actuation of said means.

7. In apparatus for attaching end stop members to slide fastener chain having a series of spaced-apart mated interlocking fastener elements secured to the opposed edges of a pair of stringer tapes and having a series of spaced-apart gap spaces arranged therein throughout the length of the chain comprising means for guiding and conveying the fastener chain into and through the apparatus, a movable finger arranged in the path of said chain which is adapted to extend successively into the gap spaces to engage an endmost fastener element of the gap space, means for moving said finger-like member to a retracted position out of the gap space, means arranged at a spaced distance from said finger for engaging the chain intermittently as it passes therealong so as to move the same forward a predetermined distance and to position the endmost fastener element of a gap space adjacent an end stop applying station, an oscillating member upon which said last mentioned means is mounted, means for oscillating said member in response to the movement of said finger, means for applying an end stop to the chain at a stop applying station directly next to the endmost fastener element of the successive gap spaces, and said last mentioned means being responsive to the movement of said chain engaging means.

8. Apparatus as defined in claim 7, including a freely rotatable roller arranged opposite said chain engaging means with which the same cooperates to move the chain along upon actuation of said means.

9. In apparatus for attaching end stop members to slide fastener chain having a series of spaced-apart mated interlocking fastener elements secured to the opposed edges of a pair of stringer tapes and having a series of spaced-apart gap spaces arranged therein throughout the length of the chain comprising means for guiding and conveying the fastener chain into and through the apparatus, a movable finger arranged in the path of said chain which is adapted to extend successively into the gap spaces to engage an endmost fastener element of the gap space, a stationary anvil arranged adjacent said finger in the path of said chain, means arranged at a spaced distance from said finger for engaging the chain intermittently as it passes therealong so as to move the same forward a predetermined distance and to position the endmost fastener element of a gap space directly next to said anvil, movable means upon which said last mentioned means is mounted, means for actuating said last mentioned means in response to the movement of said finger, and means for applying an end stop to the chain in cooperation with said stationary anvil directly next to the endmost fastener element of the successive gap spaces in response to the movement of said chain engaging means.

10. Apparatus as defined in claim 9, including a freely rotatable roller arranged opposite said chain engaging means with which the same cooperates to move the chain along upon actuation of said means.

11. In apparatus for attaching end stop members to slide fastener chain having a series of spaced-apart mated interlocking fastener elements secured to the opposed edges of a pair of stringer tapes and having a series of spaced-apart gap spaces arranged therein throughout the length of the chain comprising means for guiding and conveying the fastener chain through the apparatus, a movable finger arranged in the path of said chain which is adapted to extend successively into the gap spaces as the chain passes therealong to engage an endmost fastener element of the gap space, a stationary anvil arranged adjacent said finger in the path of said chain, means arranged at a spaced distance from said finger for engaging the chain intermittently to move the same forward a predetermined distance and to position the endmost fastener element of a gap space dictly next to said anvil, an oscillating member arranged on said support upon which said last mentioned means is mounted, means for oscillating said member in response to the movement of said finger, and means for applying an end stop to the chain in cooperation with said stationary anvil directly next to the endmost fastener element of the successive gap spaces in response to the movement of said engaging means.

12. Apparatus as defined in claim 11, including a freely rotatable roller arranged opposite said chain engaging means with which the same cooperates to move the chain along upon actuation of said chain engaging means.

13. In an apparatus for attaching end stop members to continuous length slide fastener chain having a series of spaced-apart mated interlocking fastener elements secured to the opposed edges of a pair of stringer tapes and having a series of spaced-apart gap spaces arranged therealong throughout the length of the chain, means for guiding and conveying the fastener chain into and through the apparatus, a movable finger arranged in the path of said chain which is adapted to extend successively into the gap spaces to engage the endmost fastener element at the gap space, means for controlling the actuation of said finger so as to move the same to a retracted position out of the gap space, an oscillating member arranged adjacent the path of the chain forwardly of said finger, a movable shoe-like member carried by said oscillating member forwardly of said finger which is adapted to engage the chain in one position thereof, means carried by said oscillating member for moving said shoe-like member relative thereto, means for actuating said oscillating member, means responsive to the movement of said finger for controlling the actuation of said last mentioned means, means for applying an end stop to the chain directly next to the endmost fastener element in the successive gap spaces, means responsive to the movement of said oscillating means for controlling the actuation of said last mentioned means, and means arranged opposite said shoe-like member and with which it cooperates upon actuation of said oscillating member to clamp the fastener chain so as to move the same forward a predetermined distance whereby the endmost fastener element of the successive gap spaces is positioned adjacent said anvil.

14. Apparatus as defined in claim 13, wherein the means arranged opposite the shoe-like member consists of a freely rotatable roller with which the same cooperates to move the chain along upon actuation of said oscillating member.

15. Apparatus as defined in claim 13, including means for actuating in timed relation, the finger, the oscillating member and the means for actuating the end stop applying means.

16. In apparatus for attaching end stop members to continuous length slide fastener chain having a series of spaced-apart mated interlocking fastener elements secured to the opposed edges of a pair of stringer tapes and having a series of spaced-apart gap spaces arranged therealong throughout the length of the chain, a movable finger arranged in the path of the chain which is adapted to extend successively into the gap spaces to engage the endmost fastener element at the gap space, means for controlling the actuation of said finger so as to move the same to a retracted position out of the gap space, means for guiding and conveying the fastener chain into and through the apparatus relative to said finger, an oscillating member arranged on said support, a means carried by said oscillating member forwardly of said finger which is adapted to engage the chain in one position thereof, means carried by said oscillating member for moving said last mentioned means relative thereto, means for actuating said oscillating member, means responsive to the movement of said finger for controlling the actuation of said last mentioned means, a stationary anvil arranged adjacent said finger, means in cooperation with said anvil for applying an end stop to the chain directly next to the endmost fastener element in the successive gap spaces, means responsive to the movement of said oscillating means for controlling the actuation of said last mentioned means, and means arranged opposite said shoe-like member and with which it cooperates upon actuation of said oscillating member to clamp the fastener chain so as to move the same forward a predetermined distance whereby the endmost fastener element of the successive gap spaces is positioned adjacent said anvil.

17. Apparatus as defined in claim 16, wherein the means arranged opposite the shoe-like member consists of a freely rotatable roller with which the same cooperates to move the chain along upon actuation of said oscillating member.

18. Apparatus as defined in claim 16, including means for actuating in timed relation, the finger, the oscillating member and the means for actuating the end stop applying means.

19. In apparatus for attaching end stop members to continuous length slide fastener chain having a series of spaced-apart mated interlocking fastener elements secured to the opposed edges of a pair of stringer tapes and having a series of spaced-apart gap spaces arranged therealong throughout the length of the chain,
- a movable finger arranged in the path of the chain which is adapted to extend successively into the gap spaces to engage the endmost fastener element of the gap space,
- a solenoid for controlling the actuation of said finger so as to move the same to a retracted position out of the gap space,
- means for guiding and conveying the fastener chain into and through the apparatus relative to said finger,
- an oscillating member arranged on said support,
- a movable shoe-like member carried by said oscillating member forwardly of said finger which is adapted to engage the chain in one position thereof,
- means carried by said oscillating member for moving said shoe-like member relative thereto,
- means for actuating said oscillating member,
- means responsive to the movement of said finger for controlling the actuation of said last mentioned means,
- a stationary anvil arranged adjacent said finger,
- means in cooperation with said anvil for applying an end stop to the chain directly next to the endmost fastener element in the successive gap spaces,
- means responsive to the movement of said oscillating means for controlling the actuation of said last mentioned means, and
- means arranged opposite said shoe-like member and with which it cooperates upon actuation of said oscillating member to clamp the fastener chain so as to move the same forward a predetermined distance whereby the endmost fastener element of the successive gap spaces is positioned adjacent said anvil.

20. Apparatus as defined in claim 19, wherein the means arranged opposite the shoe-like member consists of a freely rotatable roller with which the same cooperates to move the chain along upon actuation of said oscillating member.

21. Apparatus as defined in claim 19, including means for actuating in timed relation, the finger, the oscillating member and the means for actuating the end stop applying means.

22. In apparatus for attaching end stop members to continuous length slide fastener chain having a series of spaced-apart mated interlocking fastener elements secured to the opposed edges of a pair of stringer tapes and having a series of spaced-apart gap spaces arranged therealong throughout the length of the chain,
- a movable finger arranged in the path of said chain which is adapted to extend successively into the gap spaces to engage the endmost fastener element at the gap space,
- means for guiding and conveying the fastener chain into and through the apparatus relative to said finger,
- an oscillating member arranged on said support,
- a movable shoe-like member carried by said oscillating member forwardly of said finger which is adapted to engage the chain in one position thereof,
- means carried by said oscillating member for moving said shoe-like member relative thereto,
- means for actuating said oscillating member,
- means responsive to the movement of said finger for controlling the actuation of said last mentioned means,
- a stationary anvil arranged rearwardly of and adjacent said finger,
- a staple end stop forming and delivery mechanism arranged opposite said anvil with which the same cooperates to apply an end stop to the chain directly next to the endmost fastener element in the successive gap spaces,
- means responsive to the movement of said oscillating means for controlling the actuation of said mechanism, and
- means arranged opposite said shoe-like member and with which it cooperates upon actuation of said oscillating member to clamp the fastener chain so as to move the same forward a predetermined distance whereby the endmost fastener element of the successive gap spaces is positioned adjacent said anvil.

23. Apparatus as defined in claim 22, wherein the means arranged opposite the shoe-like member consists of a freely rotatable roller with which the same cooperates to move the chain along upon actuation of said oscillating member.

24. Apparatus as defined in claim 22, including means for actuating in timed relation, the finger, the oscillating member and the means for actuating the end stop applying means.

References Cited by the Examiner
UNITED STATES PATENTS
3,124,805   3/1964   Fisher _____ 1—106

GRANVILLE Y. CUSTER, Jr., *Primary Examiner.*